United States Patent
Elangovan et al.

(10) Patent No.: US 12,397,743 B2
(45) Date of Patent: Aug. 26, 2025

(54) SYSTEMS AND METHODS FOR DETECTING/PREVENTING VEHICLE PARTS THEFT

(71) Applicant: Ford Global Technologies, LLC, Dearborn, MI (US)

(72) Inventors: Vivekanandh Elangovan, Canton, MI (US); John Robert Van Wiemeersch, Novi, MI (US); Pietro Buttolo, Dearborn Heights, MI (US)

( * ) Notice: Subject to any disclaimer, the term of this patent is extended or adjusted under 35 U.S.C. 154(b) by 180 days.

(21) Appl. No.: 18/182,213

(22) Filed: Mar. 10, 2023

(65) Prior Publication Data

US 2024/0300444 A1    Sep. 12, 2024

(51) Int. Cl.
| | | |
|---|---|---|
| *B60R 25/10* | (2013.01) | |
| *B60R 25/24* | (2013.01) | |
| *B60R 25/30* | (2013.01) | |

(52) U.S. Cl.
CPC .............. *B60R 25/10* (2013.01); *B60R 25/24* (2013.01); *B60R 25/305* (2013.01); *B60R 2025/1013* (2013.01)

(58) Field of Classification Search
CPC ....... B60R 25/10; B60R 25/24; B60R 25/305; B60R 2025/1013; G01S 5/02; G01S 13/0209; G01S 13/00; G01S 13/02; G01S 13/46; G01S 13/48; G01S 7/032; G01S 7/288; G01S 5/06; G01S 5/0257; G01S 19/12; G01S 19/256; G01S 19/48; G01S 19/49; G01S 5/0226; G01S 5/02585; G01S 5/0284; G01S 5/10; H01Q 1/3233; H01Q 1/36; H04L 63/0442

See application file for complete search history.

(56) References Cited

U.S. PATENT DOCUMENTS

| | | |
|---|---|---|
| 8,963,699 B2 | 2/2015 | Potter |
| 9,493,085 B2 | 11/2016 | Van Wiemeersch et al. |
| 2015/0348417 A1* | 12/2015 | Ignaczak ................ G08B 25/08 340/435 |
| 2024/0255605 A1* | 8/2024 | Sanji ..................... G01S 5/0295 |

FOREIGN PATENT DOCUMENTS

| | | | | |
|---|---|---|---|---|
| CN | 111629349 A | * | 9/2020 | .......... B60R 25/102 |
| CN | 117335828 A | * | 1/2024 | |
| EP | 4095818 A1 | | 11/2022 | |
| JP | 2020030895 A | * | 2/2020 | |
| KR | 102297848 B1 | * | 8/2018 | ............... H04L 9/40 |
| KR | 102109695 B1 | | 5/2020 | |
| KR | 20220091981 A | | 7/2022 | |

OTHER PUBLICATIONS

Intermotive Introduces Anti-Catalytic Converter Theft Alarm, News/Media Release, Nov. 15, 2022, 1-6.

* cited by examiner

*Primary Examiner* — Brian A Zimmerman
*Assistant Examiner* — Anthony D Afrifa-Kyei
(74) *Attorney, Agent, or Firm* — Joseph Zane; Eversheds Sutherland (US) LLP

(57) ABSTRACT

Systems and methods for implementing protections against catalytic converter theft. A vehicle may comprise Ultra-Wideband (UWB) anchors or sensors. The UWB sensors of a vehicle may be used to detect the relative distance and/or location of UWB-capable devices in close proximity to the vehicle. An assessment may be performed using the UWB anchors and/or other sensors to determine whether the presence of the unknown device is indicative of a threat to the vehicle. If a threat is detected, one or more protection steps may be taken.

20 Claims, 4 Drawing Sheets

SYSTEMS AND METHODS FOR DETECTING/PREVENTING VEHICLE PARTS THEFT

BACKGROUND

There is a growing need for enhanced detection/protection of catalytic converters from theft. While there are a variety of techniques for detecting theft of vehicle parts such as catalytic converters, implementing new hardware-based protections can be expensive, and can present challenges to owners of existing cars, as retrofitting existing vehicles will take time, and not all vehicle owners may have the time, availability, or budget for having new hardware installed.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
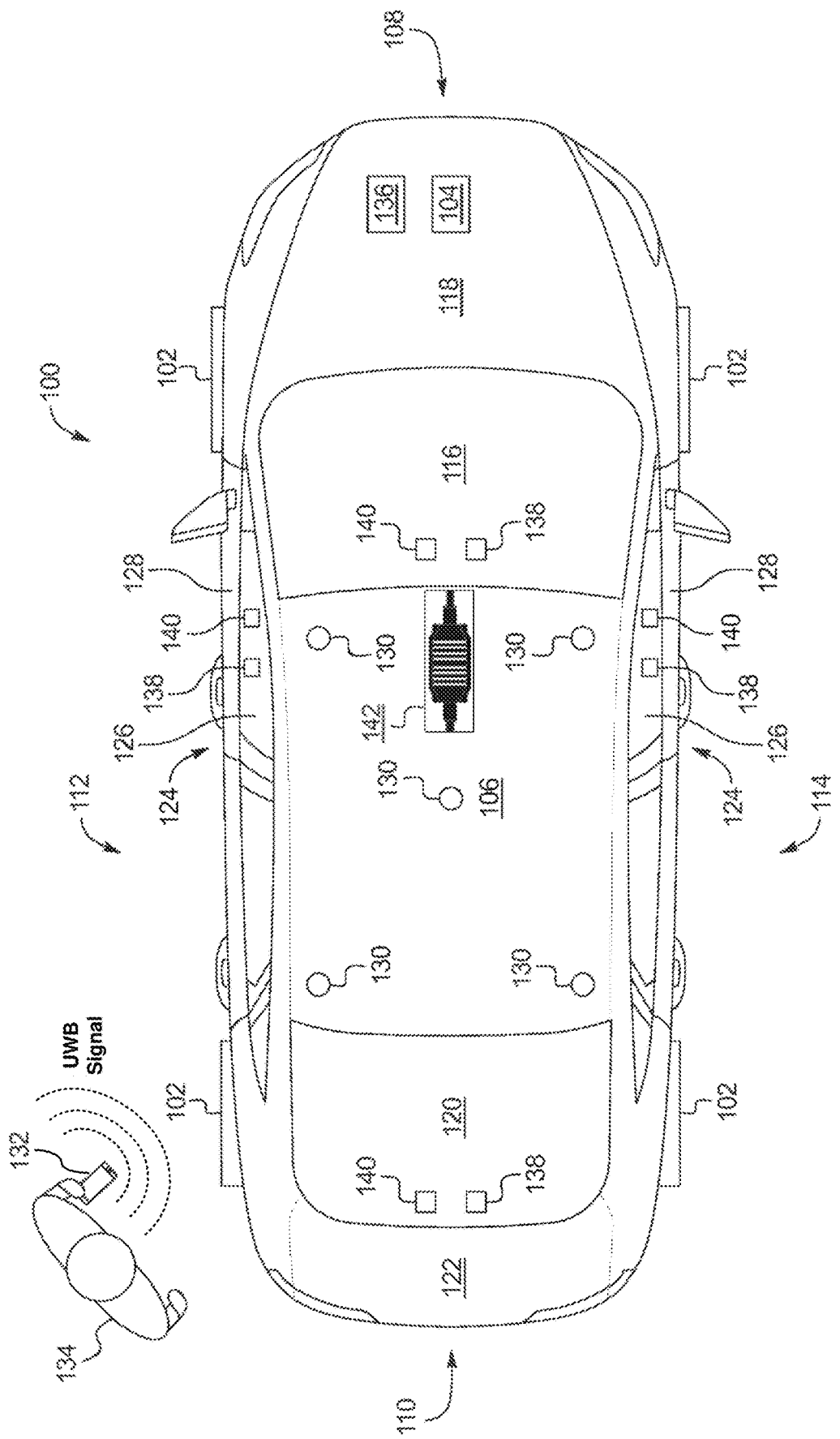
FIG. 1 illustrates an example vehicle in accordance with the teachings herein.

The present disclosure is directed to systems and methods for detecting and/or preventing the theft of components of vehicles, such as catalytic converter theft. There is a growing need for enhanced detection/protection of catalytic converters from theft. While there are a variety of techniques for detecting theft of vehicle parts such as catalytic converters, implementing new hardware-based protections can be expensive, and can present challenges to owners of existing cars, as retrofitting existing vehicles will take time, and not all vehicle owners may have the time, availability, or budget for having new hardware installed. Accordingly, while the illustrative embodiment contemplates theft of a catalytic converter, this invention could apply to any element or component attached to a vehicle underbody, such as a battery, suspension component, wiring, etc.

Techniques described herein contemplate, in at least some embodiments, a software-based solution for protecting against catalytic converter theft that involves the use of a vehicle's existing Ultra-Wideband (UWB) controller and anchors and electronic systems to detect potential catalytic converter theft. An additional advantage of the solutions presented herein is that these techniques can potentially detect attempted theft earlier than other systems, possibly avoiding any damage to the catalyst, by proactively waking sensors before malicious actors have even touched the vehicle.

Various embodiments of the present disclosure may be implemented in the context of a vehicle. A vehicle may comprise a plurality of Ultra-Wideband (UWB) primary transceivers and/or anchors located throughout the vehicles interior and/or exterior, here forward to all be referred to as anchors. The vehicle may comprise electronic systems that include one or more processors and memory storing executable instructions that, as a result of execution by the one or more processors, causes the vehicle to perform various processes described throughout this disclosure (e.g., processes in accordance with FIG. 4). In at least one embodiment, the vehicle will determine, using at least one of the UWB anchors, presence of an unknown device; determine, using the at least one UWB anchor, a distance of the unknown device to the vehicle; determine, based on the distance, that the unknown device has crossed a proximity threshold of the vehicle; determine, using the plurality of UWB anchors, a location of the unknown device; determine, based on the location of the unknown device, that the unknown device has breached the vehicle's environment; and based at least in part on the determination that the unknown device has breached the vehicle's environment, perform one or more protection steps.

In at least one embodiment, the vehicle will further: responsive to the determination that the unknown device has breached the vehicle's environment, activate one or more sensors of the vehicle, based at least in part on the location of the unknown device; determine, based on additional data collected by the one or more sensors of the vehicle, a threat level; and determine the one or more protection steps based at least in part on the threat level.

In at least one or more embodiments, the vehicle comprises audio and visual sensors that can be used to assess threats to the vehicle. In at least one embodiment, the vehicle comprises a camera underneath the vehicle that can be activated to determine whether there is a threat of catalytic converter theft.

In various embodiments, the vehicle can perform a series of escalating protection steps that includes activation of a first alarm (e.g., one chirp) and activation of a second alarm (e.g., three chirps), responsive to a determination that the unknown device is still within the proximity threshold after the activation of the first alarm.

In various embodiments, the proximity threshold is determined based at least in part on time of day or other situational factors such as whether the vehicle is located on a busy street.

In various embodiments, the vehicle will determine that a known device associated with the vehicle is not within proximity to the vehicle as part of its threat assessment. The proximity of the known device may be different from the threshold proximity for unknown devices.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes tires 102 and an engine 104. For example, each of the tires 102 is coupled to a body of the vehicle 100 at a different respective wheel well of the vehicle 100 to enable the vehicle 100 to travel along a road surface. The engine 104 of the illustrated example is an internal combustion engine, an electric motor, and/or any other power source that propels movement of the vehicle 100. In some examples, the engine 104 is initially activated upon receiving energy from a starter battery and subsequently is powered via energy receiving from an alternator.

The vehicle 100 of the illustrated example also includes a cabin 106, a front side 108, a rear side 110, a driver side 112, and a passenger side 114. The front side 108 includes a front windshield 116 and a front panel 118 (also referred to as a hood), and the rear side 110 includes a rear windshield 120 and a rear panel 122 (also referred to as a tailgate panel and/or a trunk panel). The vehicle 100 includes doors 124 that include side windows 126 and door panels 128. For example, the driver side 112 of the vehicle 100 includes one of the doors 124 (e.g., a driver-side door) that includes one of the side windows 126 and one of the door panels 128. Further, the passenger side 114 includes one of the doors 124 (e.g., a passenger-side door) that includes another of the side windows 126 and another of the door panels 128. As illustrated in FIG. 1, the front windshield 116, the front panel 118, the rear windshield 120, the rear panel 122, the side windows 126, and the door panels 128 form, at least in part, an outer layer of the vehicle 100. That is, the outer layer of the vehicle 100 includes the front windshield 116, the front panel 118, the rear windshield 120, the rear panel 122, the side windows 126, and the door panels 128. Additionally, the cabin 106 is defined, at least in part, by the front windshield 116, the rear windshield 120, and the doors 124. In some examples, the front windshield 116 is formed of laminated glass, and the rear windshield 120 and the side windows 126 are formed of non-laminated, tempered glass. Further, the front panel 118, the rear panel 122, and the door panels 128 are formed of, for example, steel, aluminum, other metallic material, plastic, carbon fiber, fiberglass, other composite material, and/or any combination thereof.

As illustrated in FIG. 1, the vehicle 100 includes one or more communication nodes 130. In the illustrated example, the communication nodes 130 are configured to wirelessly detect the presence of UWB-capable devices such as device 132 of an unknown person 134. In various embodiments, device 132 emits UWB (Ultra-Wideband) wireless signals and one or more anchors or sensors of vehicle 100 are subscribers for such signals and can use the signal to determine the relative distance or location of device 132. The location of device 132 may be used to infer the location of unknown person 134 relative to vehicle 100. In various embodiments, the unknown person 134 carries a mobile device with UWB emitters that are configured by default to periodically emit UWB wireless communications which can be received by the communication nodes 130. Device 132 may refer to any suitable device that emits UWB signals at regular intervals.

As noted above, while various embodiments described in connection with FIG. 1 discuss the use of UWB anchors, these are merely non-limiting examples of embodiments that are contemplated within the scope of this disclosure. In various embodiments, a combination of UWB transceivers and/or anchors are utilized to determine relative position and/or distance of UWB-capable devices near the vehicle.

The communication nodes 130 include hardware and firmware to establish a wireless connection with the device 132. In various embodiments, the wireless connection between the device 132 and the communication nodes 130 is a two-way communications channel that is implemented according to a specification, for example, according to an IEEE or CCC defined format. In various embodiments, the standard will be automated in the driver layer of the respective devices, such as the vehicle 100 and/or device 132 depicted in FIG. 1. As an example, the vehicle 100 and/or device 132 may send a round-trip message to the other as part of UWB Time-of-Flight (ToF) ranging that can be used to estimate the distance between the vehicle 100 and device 132. Vehicle 100 may utilize UWB signals emitted by the device 132 to determine the relative distance of the device 132, perform localization to determine the relative location of the device (e.g., whether the device is located behind the vehicle, in front of vehicle, at an angle, and so on), and implement various protective steps based on the threat level that is detected. For example, in this sense, the device 132 may be viewed as a data producer and the communication nodes 130 as data consumers. While two-way communications are described above, there may be other embodiments in which one-way communications are possible.

In various embodiments, the communication nodes 130 are short-range wireless modules that wirelessly communicate with nearby devices such as the device 132 of the unknown person 134 via short-range wireless communication protocols. In some examples, the communication nodes 130 implement the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication nodes 130 may use WiFi, WiMax, NFC, UWB (Ultra-Wideband), and/or any other communication protocol that enables the communication nodes 130 to receive data from the device 132.

In various embodiments, device 132 emits UWB signals to nearby subscribers (e.g., communication nodes 130) without requiring the subscribers to perform a pairing or identification process. Accordingly, it should be appreciated that vehicle 100 may receive UWB signals from device 132 even when unknown person 134 is "unknown" from the perspective of vehicle 100—for example, unknown person 134 may be a stranger that is walking by vehicle 100 for the first time and has never previously interacted (e.g., either physically or electronically) with vehicle 100. In various embodiments, communication nodes 130 are able to detect the presence of device 132 simply by virtue of the device 132 being in physical proximity with the vehicle 100 and not requiring any additional configuration, setup, or application settings by unknown person 134.

Figure 2:
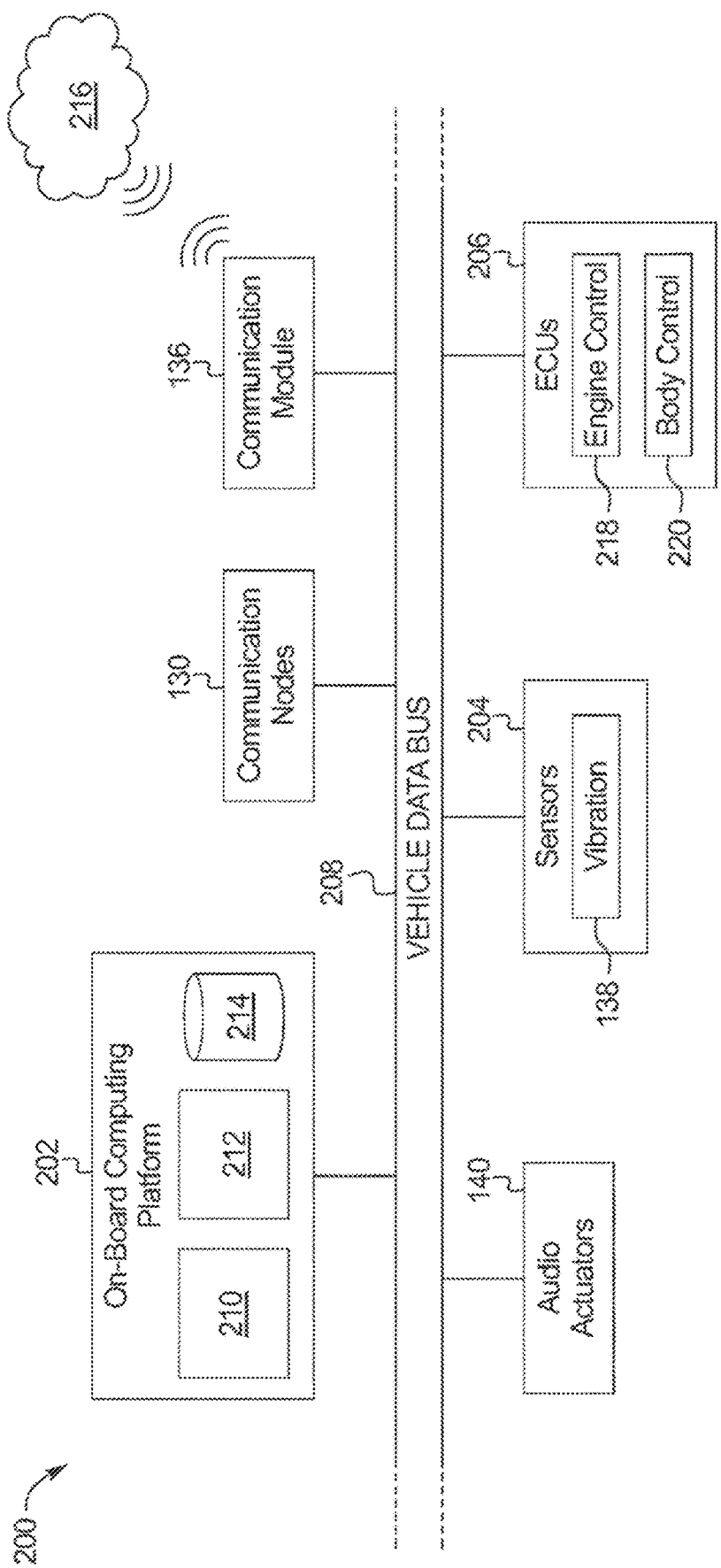
FIG. 2 is a block diagram of electronic components of the vehicle of FIG. 1.

Further, the vehicle 100 of the illustrated example includes a communication module 136 that includes wired or wireless network interfaces to enable communication with external networks (e.g., a network 216 of FIG. 2). The communication module 136 also includes hardware (e.g., processors, memory, storage, antenna, etc.) and software to control the wired or wireless network interfaces. In the illustrated example, the communication module 136 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the communication module 136 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols. In various embodiments, communication module 136 is configured to communicate with the vehicle's owner (e.g., a person other than unknown person 134) via a paired device. For example, if unknown person 134 attempts to slide under vehicle 100, UWB anchors may be used to triangulate the location of device 132 and wake up or activate additional sensors (e.g., audio and/or visual sensors) to determine whether an unauthorized activity (e.g., catalytic converter 142 theft) is occurring. Additionally, if such an activity is detected, alarms may be activated and/or the owner of vehicle 100 will be notified via communication module 136 as to the activity. Catalytic converter 142 may be located underneath the vehicle and is depicted in FIG. 1 solely for exposition purposes only.

While a single catalytic converter is depicted in FIG. 1, it is noted that other embodiments contemplated within the scope of this disclosure include vehicles that have an arrangement of multiple catalytic converters. Various techniques described herein may be applied to protect against threats to some or all of the catalytic converters of such a vehicle, including the ability to simultaneously monitor multiple components at the same time. For example, on a vehicle with two catalytic converters, the vehicle's sensors may be configured to monitor and protect both catalytic converters from theft and determine a threat level to each when unknown devices are detected near the vehicle.

The vehicle 100 also includes vibration sensors 138 that are coupled to the outer layer of the vehicle 100 to detect audio vibrations. For example, each of the vibration sensors 138 are rigidly mounted to interior surface(s) and/or exterior surface(s) of the outer layer of the vehicle 100. The vibration sensors 138 may be coupled to the interior surface(s) of the outer layer of the vehicle 100 to prevent the vibration sensors 138 from being contacted by other objects. In other examples, one or more of the vibration sensors 138 are embedded within the outer layer of the vehicle 100.

Further, in the illustrated example, each side of the vehicle 100 includes one of the vibration sensors 138. That is, one of the vibration sensors 138 is coupled to each of the front side 108, the rear side 110, the driver side 112, and the passenger side 114 of the vehicle 100. In other examples, more or less of the vibration sensors 138 may be coupled to one or more of the front side 108, the rear side 110, the driver side 112, and/or the passenger side 114 of the vehicle 100. Further, in the illustrated example, one of the vibration sensors 138 is coupled to each of the front windshield 116, the rear windshield 120, and the side windows 126. In other examples, more or less of the vibration sensors 138 may be coupled to one or more of the front windshield 116, the rear windshield 120, and/or one or more of the side windows 126. Further, in some examples, one or more of the vibration sensors 138 is coupled to the front panel 118, the rear panel 122, and/or one or more of the door panels 128.

The vibration sensors 138 of the illustrated example are configured to measure audio vibrations of portions of the outer layer of the vehicle 100 to which the vibration sensors 138 are coupled. The audio vibrations are caused by sound waves that are impinging upon the outer layer. For example, sound waves travelling through a medium (e.g., the front windshield 116, the front panel 118, the rear windshield 120, the rear panel 122, one or more of the side windows 126, one or more of the door panels 128) cause the medium to oscillate and/or vibrate.

The vibration sensors 138 measure these audio vibrations caused by the sound waves when the sound waves impinge upon the corresponding portions of the outer layer of the vehicle 100 and generate electrical signals that correspond to the measured audio vibrations. The electrical signals may be subsequently processed and/or analyzed to determine the sound waves that impinged upon the outer layer of the vehicle 100. For example, the vibration sensors 138 are accelerometers (e.g., uni-axial accelerometers, tri-axial accelerometers, micro-machined accelerometers, piezoelectric accelerometers, etc.), piezoelectric contact films, microphones, and/or any other devices that are capable of detecting sound by monitoring audio vibrations of the outer layer. In the illustrated example, the vibration sensors 138 are configured to measure audio vibrations that are perpendicular to surface(s) to which the vibration sensors 138 are coupled.

In other words, the outer layer of the vehicle 100 and the vibration sensors 138 form microphones. For example, the portions of the outer layer that couple to the vibration sensors 138 function as diaphragms of the microphones. In the illustrated example, the front windshield 116 and one of the vibration sensors 138 that is coupled to the front windshield 116 form one microphone, the rear windshield 120 and one of the vibration sensors 138 that is coupled to the rear windshield 120 form another microphone, and the side windows 126 of those of the vibration sensors 138 that are coupled to the side windows 126 form other microphones. In other examples, the front panel 118 forms a microphone when one of the vibration sensors 138 is coupled to the front panel 118, the rear panel 122 forms a microphone when one of the vibration sensors 138 is coupled to the rear panel 122, and/or one or more of the door panels 128 forms a microphone with a corresponding one or more of the vibration sensors 138.

As illustrated in FIG. 1, the vehicle 100 also includes audio actuators 140 (also referred to as vibration speaker audio actuators) that are coupled to the outer layer of the vehicle 100 to vibrate the outer layer. For example, each of the audio actuators 140 (e.g., of SoundBug devices) are rigidly mounted to interior surface(s) and/or exterior surface(s) of the outer layer of the vehicle 100. The audio actuators 140 may be coupled to the interior surface(s) of the outer layer of the vehicle 100 to prevent the audio actuators 140 from being contacted by other objects. In other examples, one or more of the audio actuators 140 are embedded within the outer layer of the vehicle 100.

Further, in the illustrated example, each side of the vehicle 100 includes one of the audio actuators 140. That is, one of the audio actuators 140 is coupled to each of the front side 108, the rear side 110, the driver side 112, and the passenger side 114 of the vehicle 100. In other examples, more or less of the audio actuators 140 may be coupled to one or more of the front side 108, the rear side 110, the driver side 112, and/or the passenger side 114 of the vehicle 100. Further, in the illustrated example, one of the audio actuators 140 is coupled to each of the front windshield 116, the rear windshield 120, and the side windows 126. In other examples, more or less of the audio actuators 140 may be coupled to one or more of the front windshield 116, the rear windshield 120, and/or one or more of the side windows 126. Further, in some examples, one or more of the audio actuators 140 is coupled to the front panel 118, the rear panel 122, and/or one or more of the door panels 128.

The audio actuators 140 of the illustrated example are configured to emit sound by vibrating corresponding portions of the outer layer of the vehicle 100 to which the audio actuators 140 are coupled. For example, each of the audio actuators 140 includes an arm that actuates upon receiving an electrical signal. For each of the audio actuators 140, the arm contacts or causes another actuator component to contact an adjacent surface of the outer layer as the arm actuates to cause the outer layer to vibrate. That is, each of the audio actuators 140 functions as an adjustable tuning fork by actuating an adjacent portion of the outer layer to cause that portion of the outer layer to form an acoustic baffle of a speaker. In other words, the outer layer of the vehicle 100 and the audio actuators 140 form speakers. In the illustrated example, the front windshield 116 and one of the audio actuators 140 that is coupled to the front windshield 116 form one speaker, the rear windshield 120 and one of the audio actuators 140 that is coupled to the rear windshield 120 forms another speaker, and the side windows 126 of those of the audio actuators 140 that are coupled to the side windows 126 form other speakers. In other examples, the front panel 118 forms a speaker when one of the audio actuators 140 is coupled to the front panel 118, the rear panel 122 forms a speaker when one of the audio actuators 140 is coupled to the rear panel 122, and one or more of the door panels 128 form a speaker with a corresponding one or more of the audio actuators 140.

In various embodiments, vehicle 100 comprises additional cameras not depicted in FIG. 1. For example, video cameras (not depicted in FIG. 1) may be located on each side of vehicle 100 and may provide 360-degrees Coverage of the vehicle 100. The cameras or other visual sensors may be in communication with various other components of vehicle 100 such as communication module 136. In various embodiments, one or more visual sensors are located underneath vehicle 100 that can be used to detect the presence of unauthorized individuals underneath the vehicle. In various embodiments, a video feed can be provided by vehicle 100 to a remote server using communication module 136 to process the video feed and perform various techniques such as object detection and/or object recognition.

FIG. 2 is a block diagram of electronic components 200 of the vehicle 100. In the illustrated example, the electronic components 200 include an on-board computing platform 202, the communication nodes 130, the communication module 136, the audio actuators 140, sensors 204, electronic control units (ECUs) 206, and a vehicle data bus 208.

The on-board computing platform 202 includes a microcontroller unit, controller or processor 210; memory 212; and a database 214. In some examples, the processor 210 of the on-board computing platform 202 is configured to implement some or all of the functionality described below in connection with FIG. 4.

The processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 212 includes multiple kinds of memory, particularly volatile memory and non-volatile memory.

The memory 212 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Further, in the illustrated example, the communication module 136 of the vehicle 100 is in wireless communication with a network 216. For example, the communication module 136 is communicatively coupled to the network 216.

The sensors 204 are arranged in and around the vehicle 100 to monitor properties of the vehicle 100 and/or an environment in which the vehicle 100 is located. One or more of the sensors 204 may be mounted to measure properties around an exterior of the vehicle 100. Additionally or alternatively, one or more of the sensors 204 may be mounted inside a cabin of the vehicle 100 or in a body of the vehicle 100 (e.g., an engine compartment, wheel wells, etc.) to measure properties in an interior of the vehicle 100. For example, the sensors 204 include accelerometers, odometers, tachometers, pitch and yaw sensors, wheel speed sensors, microphones, tire pressure sensors, biometric sensors and/or sensors of any other suitable type. In the illustrated example, the sensors 204 include the vibration sensors 138 which may act as microphones for collecting audio data.

The ECUs 206 monitor and control the subsystems of the vehicle 100. For example, the ECUs 206 are discrete sets of electronics that include their own circuit(s) (e.g., integrated circuits, microprocessors, memory, storage, etc.) and firmware, sensors, actuators, and/or mounting hardware. The ECUs 206 communicate and exchange information via a vehicle data bus (e.g., the vehicle data bus 208). Additionally, the ECUs 206 may communicate properties (e.g., status of the ECUs 206, sensor readings, control state, error and diagnostic codes, etc.) to and/or receive requests from each other. For example, the vehicle 100 may have seventy or more of the ECUs 206 that are positioned in various locations around the vehicle 100 and are communicatively coupled by the vehicle data bus 208.

In the illustrated example, the ECUs 206 include an engine control unit 218 and a body control module 220. For example, the engine control unit 218 control(s) operation (e.g., engine idle shutdown timer) of the engine 104 of the vehicle 100. Further, the body control module 220 controls one or more subsystems throughout the vehicle 100, such as power windows, power locks, an immobilizer system, power mirrors, etc. For example, the body control module 220 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 208 communicatively couples the communication nodes 130, the communication module 136, the audio actuators 140, the on-board computing platform 202, the sensors 204, and the ECUs 206. In some examples, the vehicle data bus 208 includes one or more data buses. The vehicle data bus 208 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
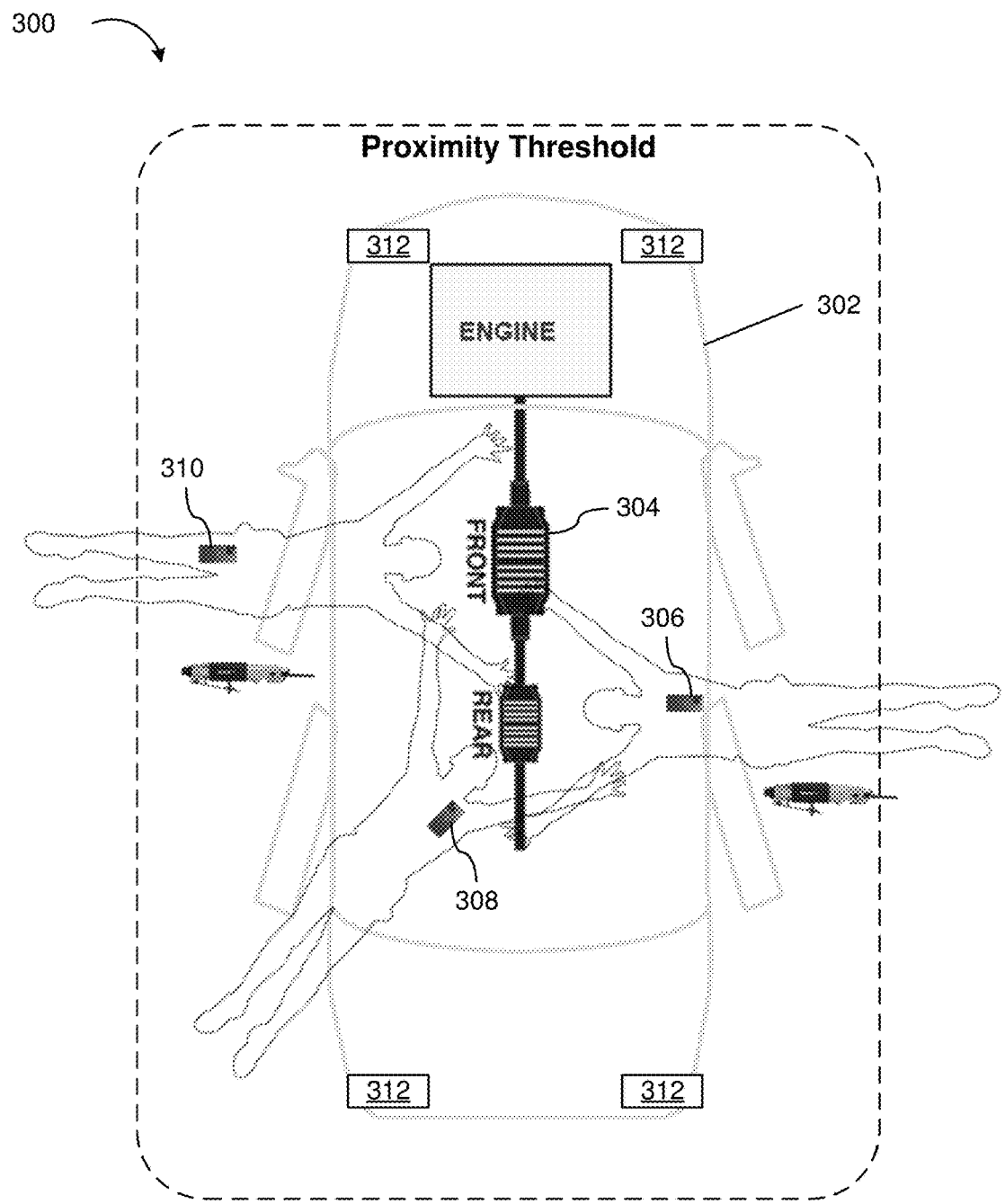
FIG. 3 depicts a diagram in which catalytic converter theft can be proactively detected, according to at least one embodiment of the present disclosure.

FIG. 3 depicts a diagram 300 in which catalytic converter theft can be proactively detected, according to at least one embodiment of the present disclosure.

Turning to FIG. 3, vehicle 302 may be a vehicle that comprises a catalytic converter 304 and various sensors suites, such as those described in connection with FIG. 1 and/or FIG. 2.

In various embodiments, vehicle 302 comprises several Ultra-Wideband (UWB) anchors 312 or sensors located on the interior and/or exterior of the vehicle that can be used to detect UWB signals that are emitted by devices (e.g., devices 306, 308, and 310) and use triangulation techniques to resolve the location of the emitter device. For example, in various embodiments, the device location is determined via UWB using Time-of-Flight (ToF) data between a device and multiple anchors and performing triangulation on the ToF results from the multiple anchors. While various embodiments described in connection with FIG. 3 discuss the use of UWB anchors, these are merely non-limiting examples of embodiments that are contemplated within the scope of this disclosure. In various embodiments, a combination of UWB transceivers and/or anchors are utilized to determine relative position and/or distance of UWB-capable devices near the vehicle.

Vehicle 302 may have installed on its electronic systems software for detecting potential catalytic converter theft. The software may be in the form of application code that interfaces with various sensors located across the device. This software, in various embodiments, will continuously detect any nearby UWB signals and determine how far away a device is from the vehicle 302.

In various embodiments, vehicle 302 is able to distinguish between known devices and unknown devices. It may be implied that a known device is associated with a known user and an unknown device is associated with an unknown user. A known device, in various embodiments, refers to a device that has been paired with vehicle 302 or is otherwise associated with the vehicle 302 in some way. Examples of known devices of the vehicle's owner include the vehicle's "key fob", or an electronic device that wirelessly communicates with the vehicle, or a "phone-as-a-key" that refers to a mobile device (e.g., a smart phone, a wearable, a smart watch, a tablet, etc.) that includes hardware and/or software to function as a key fob, and so on and so forth. Conversely, an unknown device, in various embodiments, refers to a device that has not been previous paired or otherwise associated with a vehicle.

FIG. 3 depicts a vehicle 302 and three unknown devices-device 306, device 308, and device 310, that may be owned by malicious users seeking to steal a catalytic converter 304.

In various embodiments, devices 306-310 are devices that conform to the Car Connectivity Consortium (CCC) standard for Ultra-Wideband based vehicle key solutions. In various embodiments, as part of implementing the CCC standard, the devices emit UWB signals on a regular basis and allow for communications (e.g., two-way) communications between a chip inside the device and another UWB device, such as a vehicle's UWB anchors 312. It should be noted that, in various embodiments, there is no requirement for the device and UWB anchor to be paired or otherwise perform a formal handshake in order for the UWB anchors to receive the device's UWB signals.

In various embodiments, the devices 306-310 are configured to always advertise their position via UWB signals via an open application programming interface (API). This may be in the form of a "ping" in which the device (e.g., devices 306-310) broadcast their position to the vehicle's UWB anchors to allow for the location of the device to be ascertained. Devices that implement such technology may include, without limitation, smartphones, smart watches, fitness trackers, tablets, or other types of portable electronic devices.

It should be noted that according to various implementations, there is no requirement of downloading any app by the unknown device's owners for the vehicle to be able to detect the devices (e.g., devices 306-310 owned by unknown individuals). In various embodiments, devices 306-310 are devices implemented according to one or more CCC Ultra-Wideband (UWB) standards that are natively supported by the devices' operating systems, such as iOS or Android. UWB pinging may be built into these devices so that UWB signals periodically ping to make the beacons (e.g., devices) discoverable by the UWB anchors of the vehicle.

Further, in various implementations, the UWB signals do not pose a privacy concern to devices owners. Generally speaking, the UWB signals may provide only a unique identifier that can be used to determine whether a device is a known device or unknown device from the perspective of the vehicle. That is, if the standard CCC beacon is heard by the vehicle (which may be unavoidable with this technology for any receiver) and it is not a device that is registered, authorized, or otherwise known to the vehicle, then the vehicle's alarm and alert systems may be activated to evaluate whether the presence of the unknown device is indicative of a threat to the vehicle.

Continuing with FIG. 3, devices (e.g., any of devices 306-310) may be continuously emitting pings that are detected by UWB anchors 312 of vehicle 302. The vehicle may triangulate the position of the devices by measuring how long it takes for the UWB signals to reach the various anchors. The use of UWB frequency in the range of 3.1 to 10.6 GHz can provide an accuracy within centimeters, meaning that this type of technology is highly accurate for determining the location of the emitter devices. In various embodiments, the UWB frequency range used by the devices is in the range of 6 to 8 GHz. When a device is in proximity to vehicle 302, the vehicle may determine the location of the device relative to the vehicle using a suite of UWB anchors.

If vehicle 302 detects that there is an unknown device within the proximity threshold, then the vehicle may take a set of protective measures, which may be designed to protect the vehicle against theft or damage. The vehicle may perform localization steps to determine where the unknown device is relative to the vehicle-for example, device 310 being located to the left of the vehicle may trigger camera sensors of the left side of the vehicle to activate. Additionally, if a device is detected as being inside the perimeter of the vehicle (e.g., device 306 or device 308) then a broad range of sensors may be activated. For example, camera or other sensors disposed of underneath the vehicle may be activated to determine whether the unknown person is underneath the car and either preparing to or in the process of catalytic converter theft. In some embodiments, alarms can be raised to attract attention and deter theft. In some embodiments, a notification is transmitted to a known user's device and may include media (e.g., a video clip) in real-time. In various embodiments, there are different levels of responses that can be applied based on a variety of contexts, which may be based on the relative location of the unknown device or contextual clues. Based on how much certainty there is of a breach, the vehicle's response systems may take an appropriate action based on assessment of the environment using additional sensors beyond the UWB sensor suite.

It is noted that one goal of the system is to minimize the number of false alarms, since repeatedly activating cameras, microphones, and other "high-power" components could prematurely discharge the vehicle's battery. Accordingly, the vehicle may categorize the level of perceived threat and take an appropriate action for the detected threat level. The formula used to classify level of threat can be calculated based on proximity of device to vehicle, and how long device is detected stationary nearby vehicle.

Other sensors in the vehicle that are powered in stand-by can also be used to enhance the formula. For example, capacitive sensors on door-handle and capacitive sensor on rear bumper could detect if someone is touching the side of the vehicle as they crouch and lie down to slide under. In various embodiments, piezo sensors used in "window-as-a-microphone" can be used in continuous low power mode to detect any low impact caused by someone touching the vehicle.

A "positive" signal (in the sense that something was detected by the sensors) from these extra sensors could elevate an otherwise low-level threat based solely on UWB to high level threat, and vice-versa. Alternatively, presence or absence of signal on these extra sensors could be used to lower or raise the threshold value used in the threat level formula.

Additionally, location of where the vehicle is parked, and the time of day could also be used to alter the thresholds. A vehicle parked in a crowded street in full daylight might require a more "robust" signal before threat is set as high. On the other hand, a vehicle in an isolated parking lot at night will turn on its cameras at the minimum sign of danger. In various embodiments, the proximity threshold depicted in FIG. 3 can be expanded or reduced in size based on such situational factors.

In order to reduce false alarms, the vehicle 302 may be configured to deactivate these alarms under certain conditions. For example, when a valid key is within the cabin of the vehicle or nearby the vehicle, then the protection measures described herein may be deactivated, as the presence of a known device near the vehicle can be used as an implicit hint that theft is unlikely. In various embodiments, the protection measures described herein are deactivated if the vehicle is at certain known locations. For example, if the vehicle is located at a certified mechanic's shop or other authorized auto shop, it may be appropriate to disable the protection mechanisms to allow for certain expected service work to be performed without triggering false alarms. In various embodiments, a known user can use a smartphone application to deactivate (e.g., temporarily) the protection mechanisms described herein for any reason.

Figure 4:
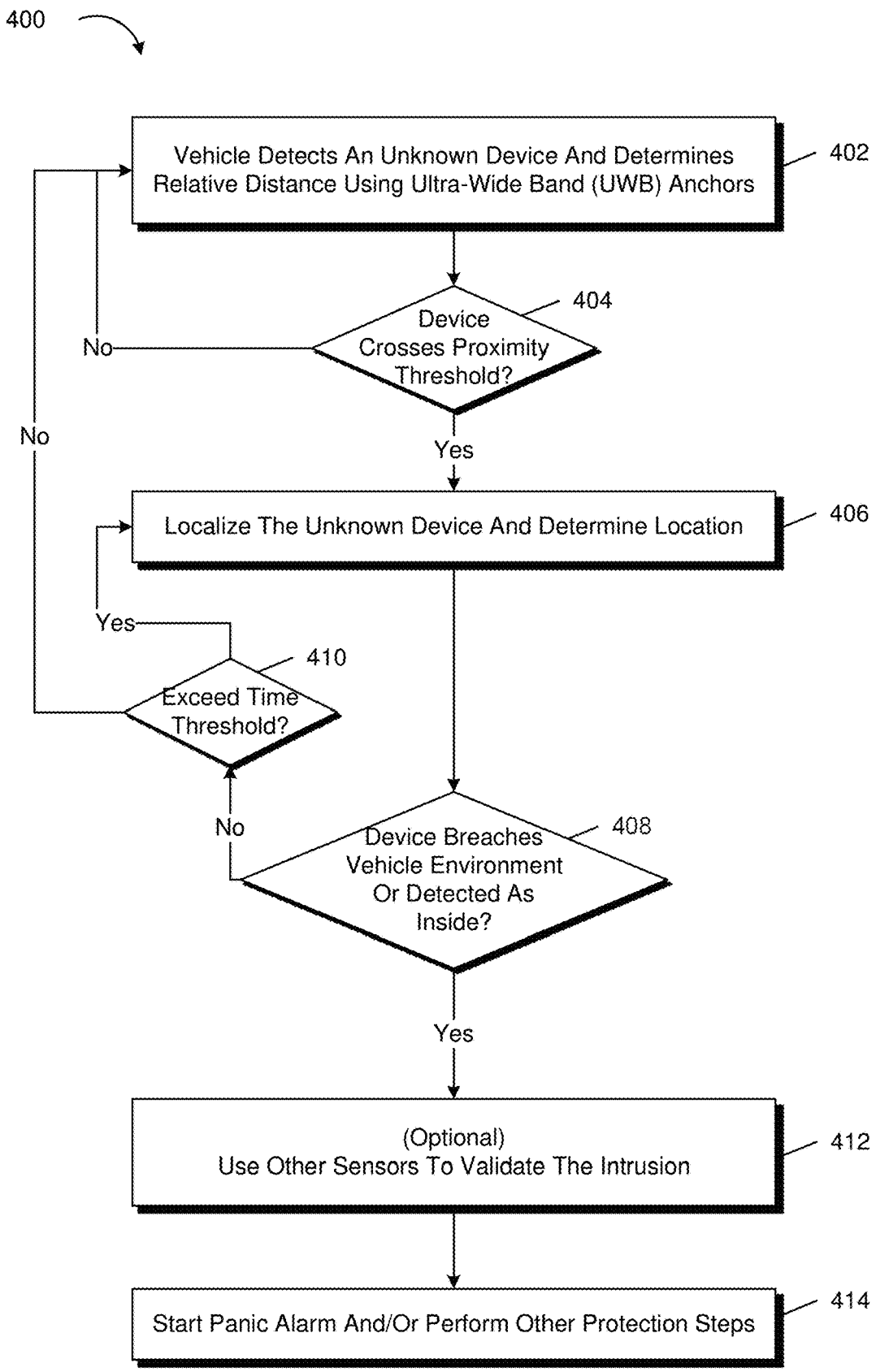
FIG. 4 shows an illustrative example of a process for detecting and/or preventing catalytic converter theft, in accordance with one or more example embodiments of the present disclosure.

FIG. 4 shows an illustrative example of a process 400 for detecting and/or preventing catalytic converter theft, in accordance with one or more example embodiments of the present disclosure. In at least one embodiment, some or all of the process 400 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 400 may be implemented in the context of various systems and methods described elsewhere in this disclosure, such as those discussed in connection with FIGS. 1-3. In at least one embodiment, process 400 or a portion thereof is collectively implemented by an electronic system of a vehicle such as those described in connection with FIGS. 1-3.

In at least one embodiment, process 400 starts with a step 402 in which a vehicle detects an unknown device and determines the relative distance of the device to the vehicle using Ultra-Wideband (UWB) anchors of the vehicle. In various embodiments, the unknown device is a device that is not paired or otherwise associated with the vehicle. The device may be a smartphone device or smartwatch device whose operating system periodically emits UWB signals that the UWB anchors of the vehicle can use to determine the relative distance of the device to the vehicle. In various embodiments, the vehicle utilizes UWB transceivers in place of or in addition to UWB anchors to perform various steps of process 600.

Once the relative distance of the unknown device has been determined, step 404 may involve determining whether unknown device has crossed a proximity threshold of the vehicle. The proximity threshold may be any suitable shape around the vehicle and the size of the proximity threshold may change based on situational factors. For example, the proximity threshold may be smaller when the vehicle is parked on a busy street in the middle of the day, whereas the proximity threshold may be larger when the vehicle is in a remote parking lot in the middle of the night. If the detected device has not crossed the proximity threshold at step 404, it may be considered to be of minimal or no threat to the vehicle and the process 400 may return to step 402 and continue to use UWB anchors to monitor for threats.

Assuming, however, that the unknown device has crossed the proximity threshold, the vehicle may perform step 406 and localize the unknown device and determine the location of the unknown device. Triangulation techniques may be utilized so that the UWB signals emitted by the unknown device are collected by multiple UWB sensors which can be used to determine a location of the device and not just its distance. For example, through the use of the multiple UWB anchors located throughout the vehicle, the vehicle's electronic systems can determine a location of the unknown device relative to the vehicle.

In various embodiments, the vehicle then proceeds to step 408 and determines whether the unknown device has breached the vehicle environment or is detected as being inside the vehicle. For example, if the relative location of the device is detected as being within the frame of the vehicle, it may mean that the device is located either inside the vehicle, on top of the vehicle, or underneath the vehicle. If such is not true, then process 400 may proceed to step 410 and continue to monitor the location of the device for a period of time at step 410. If, within this period of time, the device departs from the proximity threshold, then it may be deemed to be non-threatening. For example, if a stranger walks up to the vehicle to briefly admire or inspect the vehicle and then continues along his or her way, then the process will return to step 402 and will continue to monitor for other devices using the UWB anchors.

However, if at step 410 the unknown device has not departed significantly in range, then the vehicle will return to step 406 and continue to localize the unknown device and continue to monitor the device's location relative to the vehicle. This is to ensure that the unknown individual is not merely lingering around the vehicle for an opportune moment to perpetrate a theft.

Returning to step 408, if the unknown device is determined to breach the vehicle environment or is detected as being within the frame of the vehicle (e.g., the device is either above, inside, or below the vehicle), then protection measures may be taken. In some embodiments, optional step 412 involves the use of other sensors to validate an intrusion. The other sensors may include, for example, activating microphones to detect loud noises or sawing, video cameras to detect whether there are persons above, inside, or beneath the car, motion sensors to detect whether certain vehicle components are being subjected to excessive or unexpected physical forces, and so on and so forth.

Regardless, assuming that a sufficient threat level has been determined, the process 400 proceeds to step 414 and various protective measures may be taken. For example, a panic alarm may be initiated, the vehicle owner may be notified of a potential threat, and so on and so forth. In various embodiments, different alarms may be signaled based on different disturbance levels. For example, there may be an initial assessment period in which no alarms are triggered while the exact nature of the threat is being assessed. A disturbance level 1 may involve a single chirp and may be the first level of escalation. If this is not enough to cause the unknown device and unknown individual to leave the area, then a disturbance level 2 alarm may be performed with three chirps, and so on and so forth. A disturbance level 3 alarm may be a 23% duty cycle alarm (e.g., 220 ms alarm followed by 750 ms pause) and, if needed, followed by a disturbance level 4 alarm with a 50% duty cycle alarm (e.g., 220 ms alarm followed by 220 ms pause).

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can,""could, ""might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A vehicle, comprising:
a plurality of Ultra-Wideband (UWB) primary anchors;
one or more second sensors, wherein the one or more second sensors are different than the UWB anchors; and
one or more processors and memory storing executable instructions that, as a result of execution by the one or more processors, causes the vehicle to:
determine, using at least one UWB anchor of the plurality of UWB primary anchors, presence of an unknown device;
determine, using the at least one UWB anchor, a distance of the unknown device to the vehicle;
determine, based on the distance, that the unknown device has crossed a proximity threshold of the vehicle;
determine, using the plurality of UWB primary anchors, a location of the unknown device;
determine, based on the location of the unknown device, that the unknown device is within a boundary defined by the vehicle's frame; and
responsive to the determination that the unknown device is within the boundary defined by the vehicle's frame, activate the one or more second sensors; and
determine, using the one or more second sensors, that the unknown device is located underneath the vehicle and an unknown user associated with the unknown device is preparing for or is currently engaging in a theft of a vehicle component from underneath the vehicle.

2. The vehicle of claim 1, wherein the executable instructions, as a result of execution by the one or more processors, further causes the vehicle to:
determine, based on additional data collected by the one or more second sensors of the vehicle, a threat level; and
determine one or more protection steps based at least in part on the threat level.

3. The vehicle of claim 2, wherein the one or more second sensors comprise audio and visual sensors.

4. The vehicle of claim 2, wherein the one or more second sensors comprise a camera underneath the vehicle.

5. The vehicle of claim 2, wherein the one or more protection steps comprises:
activation of a first alarm; and
activation of a second alarm, responsive to a determination that the unknown device is still within the proximity threshold after the activation of the first alarm.

6. The vehicle of claim 1, wherein the proximity threshold is determined based at least in part on time of day.

7. The vehicle of claim 1, wherein the executable instructions, as a result of execution by the one or more processors, further causes the vehicle to:
determine that a known device associated with the vehicle is not within proximity to the vehicle.

8. A method, comprising:
determining, using at least one Ultra-Wideband (UWB) anchor of a vehicle, presence of an unknown device;
determining, using the at least one UWB anchor, a distance of the unknown device to the vehicle;
determining, based on the distance, that the unknown device has crossed a proximity threshold of the vehicle;
determining, using a plurality of UWB anchors of the vehicle, a location of the unknown device;
determining, based on the location of the unknown device, that the unknown device is within a boundary defined by the vehicle's frame;
responsive to the determination that the unknown device is within the boundary defined by the vehicle's frame, activating one or more second sensors, wherein the one or more second sensors are different than the UWB anchors; and
determining, using the one or more second sensors, that the unknown device is located underneath the vehicle and an unknown user associated with the unknown device is preparing for or is currently engaging in a theft of a vehicle component from underneath the vehicle.

9. The method of claim 8, further comprising:
determining, based on additional data collected by the one or more second sensors of the vehicle, a threat level; and
determining one or more protection steps based at least in part on the threat level.

10. The method of claim 9, wherein the one or more second sensors comprise audio and visual sensors.

11. The method of claim 9, wherein the one or more second sensors comprise a camera underneath the vehicle.

12. The method of claim 9, wherein performing the one or more protection steps comprises:
activating a first alarm;
determining that the unknown device is still within the proximity threshold after activating the first alarm; and
activating a second alarm.

13. The method of claim 8, wherein the proximity threshold is determined based at least in part on time of day.

14. The method of claim 8, further comprising determining that a known device associated with the vehicle is not within proximity to the vehicle.

15. A non-transitory computer-readable storage medium storing executable instructions that, as a result of being executed by one or more processors of an on-board system of a vehicle, cause the vehicle to at least:
    determine, using at least one Ultra-Wideband (UWB) primary anchor of the vehicle, presence of an unknown device;
    determine, using the at least one UWB anchor, a distance of the unknown device to the vehicle;
    determine, based on the distance, that the unknown device has crossed a proximity threshold of the vehicle;
    determine, using a plurality of UWB primary anchors of the vehicle, a location of the unknown device;
    determine, based on the location of the unknown device, that the unknown device is within a boundary defined by the vehicle's frame;
    responsive to the determination that the unknown device is within the boundary defined by the vehicle's frame, activate one or more second sensors, wherein the one or more second sensors are different than the UWB anchors; and
    determine, using the one or more second sensors, that the unknown device is located underneath the vehicle and an unknown user associated with the unknown device is preparing for or is currently engaging in a theft of a vehicle component from underneath the vehicle.

16. The non-transitory computer-readable storage medium of claim 15, wherein the executable instructions, as a result of execution by the one or more processors, further causes the vehicle to:
    determine, based on additional data collected by the one or more second sensors of the vehicle, a threat level; and
    determine one or more protection steps based at least in part on the threat level.

17. The non-transitory computer-readable storage medium of claim 16, wherein the one or more second sensors comprise audio and visual sensors.

18. The non-transitory computer-readable storage medium of claim 16, wherein the one or more second sensors comprise a camera underneath the vehicle.

19. The non-transitory computer-readable storage medium of claim 16, wherein the one or more protection steps comprises:
    activation of a first alarm; and
    activation of a second alarm, responsive to a determination that the unknown device is still within the proximity threshold after the activation of the first alarm.

20. The non-transitory computer-readable storage medium of claim 15, wherein the proximity threshold is determined based at least in part on time of day.

* * * * *